No. 767,401. PATENTED AUG. 16, 1904.
M. D. GLASSBROOK.
HORSESHOE.
APPLICATION FILED MAR. 13, 1903.
NO MODEL.

WITNESSES: INVENTOR

No. 767,401. Patented August 16, 1904.

UNITED STATES PATENT OFFICE.

MYRON D. GLASSBROOK, OF ANGOLA, INDIANA.

HORSESHOE.

SPECIFICATION forming part of Letters Patent No. 767,401, dated August 16, 1904.

Application filed March 13, 1903. Serial No. 147,647. (No model.)

*To all whom it may concern:*

Be it known that I, MYRON D. GLASSBROOK, a citizen of the United States, residing at Angola, in the county of Steuben and State of Indiana, have invented certain new and useful Improvements in Horseshoes, of which the following is a specification.

My invention relates to horseshoes, and has for its object to provide an artificial frog that is made of any suitable material and attached in any desired manner to a suitable bar secured to the two prongs of the horseshoe, said bar having rearwardly-extending arms on which a cushion is secured that acts as the artificial frog aforesaid.

It is a well-known fact that the hoofs of horses that are kept shod continuously and driven on hard roads or paved streets eventually become diseased, caused by the lack of exercise permitted because of the shoe, this being especially so of the "frog" of the hoof, which because of non-use becomes decayed and crumbles away. This is a fruitful cause of lameness and necessitates turning the animal out to pasture barefooted occasionally to recover the use of its hoofs.

My invention provides an artificial frog that may be attached to the shoe and bridging the space between the frog and ground presses against the frog and gives it the exercise intended by nature.

The advantages of my invention will more fully appear hereinafter and by reference to the accompanying drawings, in which—

Figure 1:
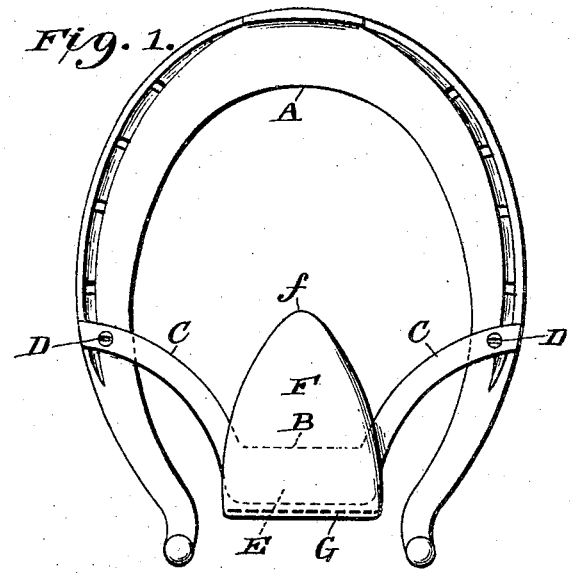
Figure 2:
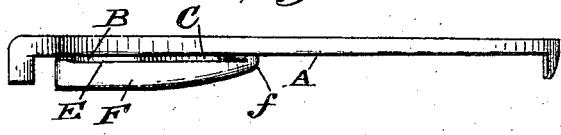

Figure 1 is a bottom view of a horseshoe to which my invention is applied and showing it in position; Fig. 2, a side view of the shoe and device attached, and Fig. 3 a modification showing another means for attaching the artificial frog to the bar.

Referring to the drawings, in which similar reference characters indicate corresponding parts throughout the several views, A represents a horseshoe of ordinary construction, and B a bar formed of two rearwardly-curved arms C, attached at their ends to the sides of the horseshoe by means of screws or rivets D and having its center portion consisting of a transverse bar E.

Figure 3:
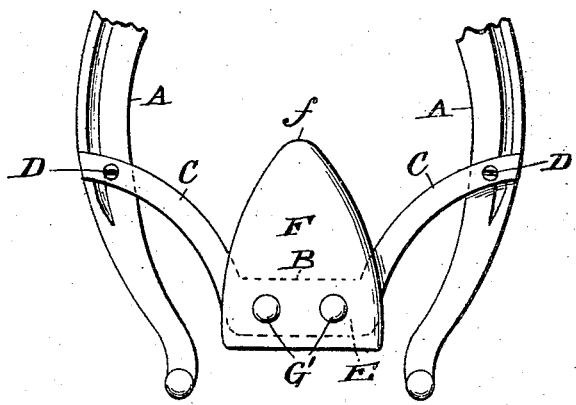

F represents a cushion of hard rubber or other suitable material, preferably of an elastic character, secured to said transverse bar E by stitching G, as shown in Fig. 1, or by rivets G', as illustrated in Fig. 3, said cushion F being shield shape in contour, with its point ƒ toward the toe of the shoe and so formed that it bears in the frog of the hoof.

As the lower side of the cushion F projects a little beyond the plane of the bottom of the toe and heel calks, as shown in Fig. 2, the horse in putting his hoof on the ground will press the cushion F against the frog of the foot, which will give it the action demanded by nature. The arms C of the spreader-bar allows a slight elasticity to the action of the cushion, drawing the cushion away from the frog when pressure is removed and so that the frog is allowed to expand to its natural position. This, it will be readily seen, will avoid the objections to the use of shoes for horses, doing away with the necessity for pasturing the animal occasionally, while the cushion also acts as an antislipping device because of its frictional nature.

It will be noted that the cushion F in acting upon the frog and withdrawing therefrom swings through an arc, the center of which being somewhere in the curved arms causes the rear end of the cushion to press up higher than the front end, the point, however, being held against the frog by the ground.

Having thus described my invention, what I claim is—

1. In combination with a horseshoe, a bar secured thereto having rearwardly-extending arms and a lateral cross-bar, and a cushion secured thereto, substantially as shown and described.

2. In combination with a horseshoe, a bar secured thereto having rearwardly-extending arms and a lateral cross-bar, and a cushion of elastic material secured thereto, substantially as shown and described.

3. In combination with a horseshoe, a bar secured thereto having rearwardly-extending arms and a lateral cross-bar, and a cushion of rubber secured thereto, substantially as shown and described.

4. In combination with a horseshoe, a bar removably secured thereto having rearwardly-extending arms and a lateral cross-bar, and a cushion secured to said cross-bar, substantially as shown and described.

5. In combination with a horseshoe, a bar removably secured thereto having rearwardly-extending arms and a lateral cross-bar, and a cushion of elastic material secured to said cross-bar, substantially as shown and described.

6. In combination with a horseshoe, a bar removably secured thereto having rearwardly-extending arms and a lateral cross-bar, and a cushion of rubber secured to said cross-bar, substantially as shown and described 7. In combination with a horseshoe, a bar secured thereto having rearwardly-extending arms and a lateral cross-bar, and a shield-shaped cushion secured to said cross-bar, substantially as shown and described.

8. In combination with a horseshoe, a bar secured thereto having rearwardly-extending arms and a lateral cross-bar, and a shield-shaped cushion of elastic material secured to said cross-bar, substantially as shown and described.

9. In combination with a horseshoe, a bar secured thereto having rearwardly-extending arms and a lateral cross-bar, and a rubber shield-shaped cushion secured to said cross-bar, substantially as shown and described.

10. In combination with a horseshoe, a bar removably secured thereto having inwardly-curved and rearwardly-extending arms and a lateral cross-bar, and a rubber shield-shaped cushion secured at its widest part to said cross-bar and having its point extended to the front, substantially as shown and described.

11. An artificial frog, for use with horseshoes, comprising a V-shaped member having its ends fastened intermediate the toe and heel of the shoe and its angular portion extending toward the heel of the shoe, and a pad of yieldable material secured to said angular portion and having its unsecured portion extending toward the toe of the shoe, substantially as shown and described.

In testimony whereof I hereto affix my signature in the presence of two witnesses.

MYRON D. GLASSBROOK.

Witnesses:
    WILLIAM L. BRANN,
    SAMUEL B. MAXFIELD.